(12) United States Patent
Kikuchi et al.

(10) Patent No.: US 7,959,965 B2
(45) Date of Patent: Jun. 14, 2011

(54) INSTANT GREEN TEA

(75) Inventors: Tatsuya Kikuchi, Makinohara (JP); Masashige Taniguchi, Makinohara (JP)

(73) Assignee: Ito En, Ltd, Tokyo (JP)

( * ) Notice: Subject to any disclaimer, the term of this patent is extended or adjusted under 35 U.S.C. 154(b) by 0 days.

(21) Appl. No.: 12/880,702

(22) Filed: Sep. 13, 2010

(65) Prior Publication Data
US 2010/0330243 A1 Dec. 30, 2010

Related U.S. Application Data

(63) Continuation of application No. PCT/JP2008/001992, filed on Jul. 25, 2008.

(30) Foreign Application Priority Data

Mar. 14, 2008 (JP) .................................. 2008-066660

(51) Int. Cl.
A23F 3/16 (2006.01)
(52) U.S. Cl. ......... 426/597; 426/435; 426/546; 426/541
(58) Field of Classification Search .................. 426/435, 426/597, 546, 541
See application file for complete search history.

(56) References Cited

U.S. PATENT DOCUMENTS

| 7,815,960 | B2 * | 10/2010 | Quan et al. ..................... 426/597 |
| 2007/0009640 | A1 * | 1/2007 | Hiramoto et al. ............. 426/597 |
| 2007/0092624 | A1 * | 4/2007 | Iwasaki et al. ................ 426/597 |
| 2009/0148554 | A1 * | 6/2009 | Kataoka et al. .................. 426/2 |

FOREIGN PATENT DOCUMENTS

| JP | 59-031649 | | 2/1984 |
| JP | 1-257430 | * | 10/1989 |
| JP | 06-178650 | | 6/1994 |
| JP | 2000-219880 | | 8/2000 |
| JP | 2003-274859 | | 9/2003 |
| JP | 2005-058142 | | 3/2005 |
| JP | 2006-217815 | | 8/2006 |
| JP | 2006-254819 | | 9/2006 |
| JP | 2007-330190 | | 12/2007 |
| KR | 2006094120 | * | 8/2006 |
| WO | WO-95/22910 | | 8/1995 |

OTHER PUBLICATIONS

English translation of KR 2006094120 which was published Aug. 2006.*
Ikegaya, et al. "Quantitative Analysis of Tea Constituents" Tea Research Journal, 1990, No. 71, pp. 43-74.
International Search Report in PCT/JP2008/001992 dated Oct. 21, 2008.

* cited by examiner

Primary Examiner — Anthony Weier
(74) Attorney, Agent, or Firm — Foley & Lardner LLP

(57) ABSTRACT

According to one embodiment, there is provided an instant green tea which contains a dry green tea extract, a drying auxiliary agent, antioxidants, a tea powder and a specific amount of potassium, and a method of producing the instant green tea includes the step of extracting tea leaves with an extraction solvent which contains a drying auxiliary agent and a first antioxidant and has been adjusted to a pH value within the neutral range by using a first potassium preparation to give a liquid extract, the step of adding a second antioxidant and a tea powder to the liquid extract thus obtained, and the step of drying the liquid extract after the completion of the addition step as described above.

7 Claims, 2 Drawing Sheets

US 7,959,965 B2

INSTANT GREEN TEA

CROSS REFERENCE TO RELATED APPLICATIONS

This is a Continuation Application of PCT Application No. PCT/JP2008/001992, filed Jul. 25, 2008, which was published under PCT Article 21(2) in Japanese.

This application is based upon and claims the benefit of priority from prior Japanese Patent Applications No. 2008-066660, filed Mar. 14, 2008; and No. 2008-327862 (a division of Application No. 2008-066660), filed Mar. 14, 2008, the entire contents of both of which are incorporated herein by reference.

BACKGROUND OF THE INVENTION

1. Field of the Invention

The present invention relates to instant green tea having excellent taste and flavor, having a vivid green color in its powder form and as a beverage, and being resistant to sedimentation during the period from preparation to serving.

2. Description of the Related Art

Instant green tea allowing green tea to be served without the need for such time-consuming work as brewing in a teapot is available. Such instant green tea generally takes the form of a dry powder, and can be served by being mixed with hot water in a vessel such as a tea cup.

Such instant green tea was developed for the purpose of eliminating the time-consuming work in preparing tea. As a result, the quality of the resulting tea, such as flavor, was lower than that of normal green tea.

For that reason, development of instant green tea for the purpose of giving a preparation having a quality equivalent to that of the green tea prepared by normal brewing method has been in progress.

Jpn. Pat. Appln. KOKAI Publication No. 2003-274859 discloses a method of producing an instant green tea by dispersing a tealeaf powder in an aqueous solvent containing a drying aid, preferably adjusting the pH of the leaf dispersion to 6.0 to 7.2 and spray-drying the dispersion.

Jpn. Pat. Appln. KOKAI Publication No. 6-178650 discloses a method of producing an antioxidative instant green tea by mixing a green tea leaf powder, a green tea extraction solution and an excipient, adjusting the solid matter content in the mixture to 40 to 85 wt %, and drying the mixture under vacuum.

Jpn. Pat. Appln. KOKAI Publication No. 59-31649 discloses an instant green tea produced by mixing an extraction solution obtained by dissolving and extracting the soluble components in tea leaves or the concentrated solution thereof, with a tea leaf fine powder, a filler and other additives and drying the resulting mixture.

Although many instant green teas have been developed, none has excellent taste and flavor, a vivid green color in its powder form and as a beverage, and is resistant to sedimentation during the period from preparation to serving.

An object of the present invention is to provide an instant green tea that has excellent taste and flavor and a vivid green color in its powder form and as a beverage, and is resistant to sedimentation during the period from preparation to serving.

BRIEF SUMMARY OF THE INVENTION

According to the present invention, there is provided an instant green tea comprising: a green tea extract; an antioxidant; a powder tea; and potassium, wherein the potassium content is 0.8 to 5.6 mass % in the instant green tea.

According to the present invention, there is provided a method of producing an instant green tea, comprising: a step of preparing an extraction solution from tea leaves with an extraction solvent containing a drying aid and a first antioxidant that is previously adjusted to a pH in the neutral zone with a first potassium preparation; a step of adding a second antioxidant and a powder tea to the extraction solution obtained; and a step of drying the extraction solution after the addition step.

The present invention provides an instant green tea that has excellent taste and flavor and a vivid green color in its powder form and as a beverage, and is resistant to sedimentation during the period from preparation to serving, and a production method thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
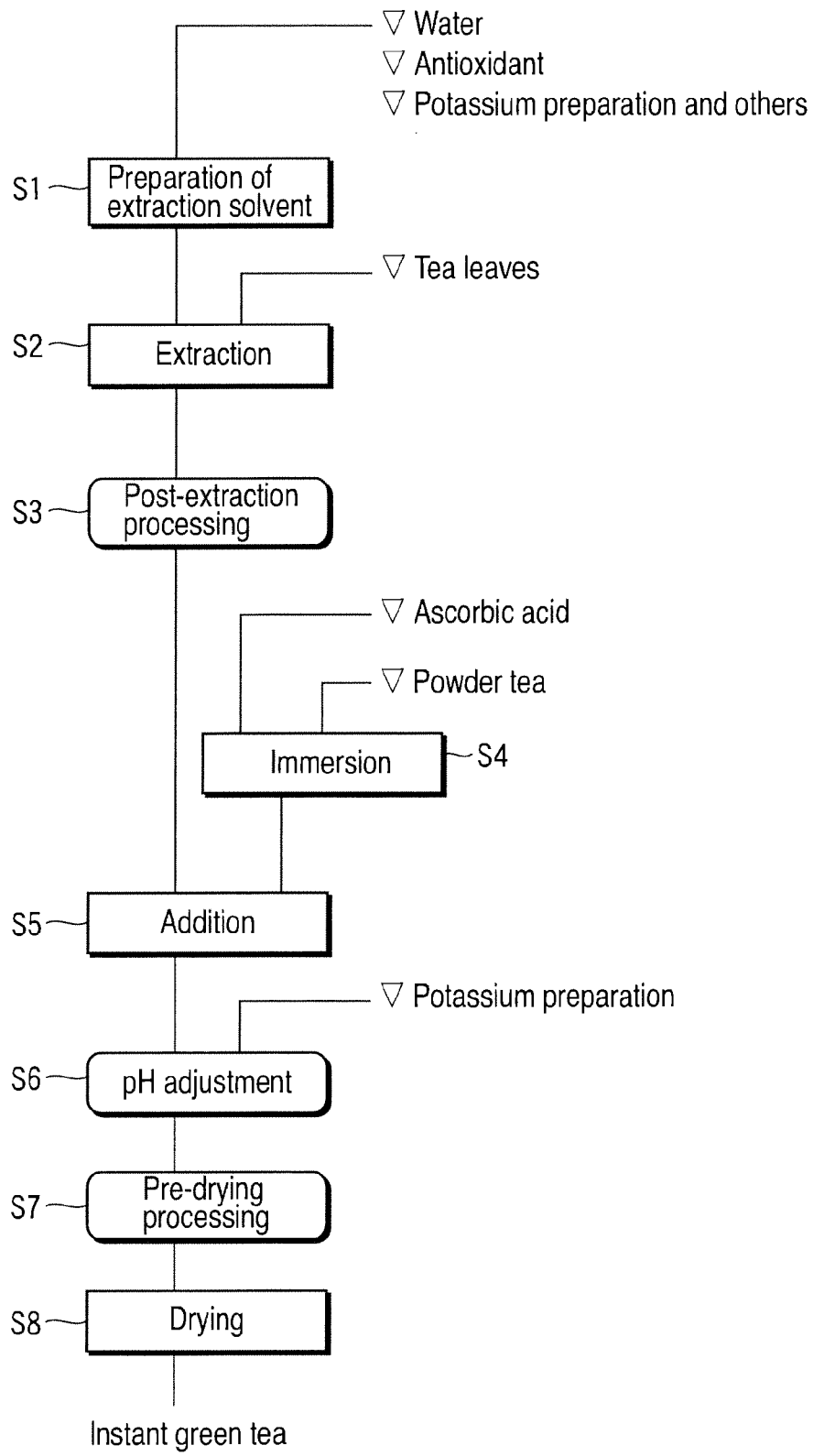
FIG. 1 is a flowchart showing a general method of producing an instant green tea according to the present invention.

The present invention relates to a potassium-containing instant green tea.

The instant green tea is a powder in the dry state that is served as green tea as it is dissolved in hot or cold water in a suitable amount. Generally, ready-to-serve beverages prepared by dissolving such a powder for example in hot water occasionally are also called instant green teas.

The instant green tea according to the present invention contains potassium. As used herein, the term potassium is intended to any potassium including a compound of potassium such as a salt thereof.

The potassium content in the instant green tea according to the present invention is 0.8 to 5.6 mass %. It is preferably 1.2 to 4.4 mass %. It is more preferably 1.6 to 3.1 mass %. The potassium content in the instant green tea according to the present invention is most preferably 2.15 mass %. These value corresponds to 7 to 45 mg, preferably 10 to 35 mg, more preferably 13 to 25 mg, and most preferably 17.2 mg of potassium in 0.8 g of instant green tea, as expressed by weight. However, the serving concentration thereof in these case is 0.8 g/100 cc.

The potassium content in the instant green tea according to the present invention can be determined quantitatively by using a quantitative determination method commonly practiced in the art. It can be determined for example by dissolving the instant green tea according to the present invention in a certain amount of solution and determining potassium therein quantitatively by emission spectroscopy, and particularly preferably by plasma emission spectroscopy.

There was no known instant green tea containing potassium in a relatively large amount like that according to the present invention.

The sodium content in the instant green tea according to the present invention is not larger than the potassium content. The sodium content is determined quantitatively, similarly to the potassium content, for example, by plasma emission spectroscopy. Similarly to the term potassium, the term sodium also includes any sodium including a compound of sodium such as a salt thereof. In other words, the phrase that the sodium content is not larger than the potassium content means that the ratio of potassium/(sodium+potassium) is 0.5 to 1.0. The ratio is more preferably 0.7 to 1.0 and still more preferably 0.9 to 1.0. In conventional instant green tea, a sodium preparation is used in the production phase, leading to increase in sodium content and apparent deterioration in quality of the instant green tea. However, the instant green tea according to the present invention, in which the sodium content is lower than conventional instant green tea, is resistant to deterioration in apparent quality of the tea.

Preferably in the instant green tea according to the present invention, there is a certain relationship between the content of particular amino acids and that of potassium. Specifically, the particular amino acids mean general amino acids such as glutamic acid, glutamine, arginine and theanine. Preferably, the instant green tea according to the present invention preferably has a ratio of potassium content/amino acid content of 4 to 10. The value is more preferably 5 to 10 and still more preferably 6 to 10. The amino acid content can be determined quantitatively by a quantitative determination method commonly practiced in the art. In particular, it can be determined by high-performance liquid chromatography. Generally, the flavor of tea depends mainly on amino acids. However, the present invention provides an instant green tea that has a smaller amino acid content but yet gives quality tea-like impression and strong favorable flavor.

The instant green tea according to the present invention contains a green tea extract. The green tea extract is a substance obtained by extraction of raw tea leaves with a suitable solvent and suitable treatment such as concentration and drying of the resulting extract. The raw tea leaf is not particularly limited, as long as it is tea leaf obtained from a tea plant (scientific name: *Camellia Sinensis*), regardless of the kind, producing region, harvesting season, cultivation method and processing method. Of course, multiple kinds of raw tea leave may be used in combination. The raw tea leaf may be processed by any processing method commonly known. An example thereof is a method of reducing the water content of raw leaf to 3% or less by drying at a temperature of 80 to 160° C., preferably 120 to 150° C., more preferably 135 to 145° C. for 20 to 30 minutes. These methods favorably provide an instant green tea having a vivid green powdery or light blue appearance and showing a favorable mild flavor. Dextrins and cyclodextrins, which are present in the instant green tea, may reduce the favorable flavor characteristic of tea, and thus, a Hojicha (roasted tea) or a brown rice tea, for example, may be added for suppressing the deterioration in such flavor. However, the extraction solution of Hojicha is reddish and sometimes too strong in roast flavor, and thus, the amount of the extraction solution of Hojicha added is preferably 0.1 to 10 mass %, more preferably 1 to 5 mass %, in the instant green tea, for production of an instant green tea, powder or beverage, appearing vivid green and showing smooth favorable flavor.

The instant green tea according to the present invention may contain a drying aid. For example, the instant green tea according to the present invention contains dextrins or cyclodextrins, preferably both. It may contain, in addition to dextrins and cyclodextrins, gelatin or other sugars.

The instant green tea according to the present invention contains an antioxidant substance. The antioxidant substance is preferably an organic acid or an organic salt, more preferably citric acid or ascorbic acid. In particular, the antioxidant substance is preferably ascorbic acid. When ascorbic acid is used, the content thereof, as shown by concentration in the extraction solvent, is preferably 1000 to 3200 ppm, more preferably 1600 to 2800 ppm, and still more preferably 2000 to 2400 ppm. In particular, ascorbic acid is preferably contained in an amount of 2.75 mass % in the powdery instant green tea. As shown in Jpn. Pat. Appln. KOKAI Publication No. 2006-254819 filed by the present applicant, use of an antioxidant substance is effective in providing favorable green color to the instant green tea powder and beverage preparations.

The instant green tea according to the present invention contains a powder tea. The powder tea is a fine powder produced by grinding the tea leaves of a tea plant. Its particle size is 100 μm or less, and preferably, the 50% particle diameter in its integrated distribution curve is 1 to 50 μm, particularly preferably 1 to 20 μm; and the 90% particle diameter is preferably 60 μm; such a powder tea is commonly used, but the present invention is not limited thereto. Any powder tea, regardless of its kind, may be used in the instant green tea according to the present invention. The powder tea for use may be a Maccha powder tea. In particular, use of Maccha obtained from tea leaves grown as covered with cloth or reed screen (covered culture) such as Tencha, Gyokuro or Kabusecha tea is advantageous for providing the beverage with favorable green color. In addition, use of a Maccha powder tea prepared by grinding Tencha tea is preferable from the viewpoint of flavor. The content of the Maccha powder tea in the instant green tea according to the present invention is preferably 5 to 10 mass %.

The present invention also relates to a method of producing an instant green tea.

FIG. 1 shows a general method of producing an instant green tea according to the present invention.

The method of producing an instant green tea according to the present invention includes specifically a step of obtaining an extraction solution of tea leaves by using an extraction solvent containing a drying aid and a first antioxidant and previously adjusted to a pH in the neutral region with a potassium formulation (indicated by S2 in FIG. 1), a step of adding a second antioxidant and a powder tea to the resulting extraction solution (indicated by S5 in FIG. 1), and a step of drying the extraction solution after the addition step (indicated by S8 in FIG. 1).

Processing in the step of extracting tea leaves with a potassium-containing solution gives a tea leaf extract containing the green tea components and potassium. Specifically, a potassium-containing extraction solvent is prepared before extraction (S1 in FIG. 1), and the green tea component is extracted from raw tea leaves by using the extraction solvent (S2).

In preparation of the extraction solvent (S1), a potassium-containing extraction solvent is prepared by adding a potassium formulation to the extraction solvent. The potassium formulations, as described herein, include potassium salts of acids, and typical examples thereof include potassium carbonate, potassium chloride, potassium phosphate, and potassium tartrate. In particular, use of potassium carbonate is preferable. The extraction solvent contains an antioxidant and a drying aid, in addition to the potassium formulation. For example, the first antioxidant is an organic acid or an organic salt (in particular, organic acid sodium salt), in particular ascorbic acid or an ascorbate salt (in particular, sodium ascorbate), or citric acid or a citrate salt (in particular, sodium citrate). Examples of the drying aids include dextrin, cyclodextrin, or the combination thereof. In addition, the extraction solvent may contain as needed other sugars, gelatin, pectin, casein, proteins, gumming agents, emulsifiers, antioxidants, and others. Any water such as tap water, deionized water, distilled water, or deoxygenated water may be used as the aqueous solvent for dissolving these components. Addition of ascorbic acid to the extraction solvent as the first antioxidant substance and pH adjustment with potassium carbonate into the neutral zone are preferable for providing the powder and beverage with a more favorable color. The concentration of ascorbic acid in the extraction solvent is preferably 1000 ppm, particularly preferably 1000 to 3000 ppm. Potassium carbonate is added to the extraction solvent for adjustment of the pH into the neutral zone, specifically to a pH of 4.5 to 7.0, particularly preferably to 5.5 to 6.0.

The tea leaves are extracted by using the extraction solvent thus prepared (S2). The extraction is carried out in a kneader commonly used in the art, while the mixture is agitated as needed for 30 seconds to 30 minutes under normal pressure. The amount of the extraction solvent used then is 15 to 20 times larger than that of the tea leaves, and the mixture is heated to 50 to 98° C. The extraction apparatus is not limited to the kneader, and any apparatus commonly used in the art may be used. The tea leaves described above are used as the tea leaves in this step.

The post-extraction processing step (S3) may be carried out between the extraction step (S2) and the step of adding a powder tea and others (S5). For example, liquid fraction of the extract obtained in the extraction step may be separated by solid liquid separation and cooled to 5 to 40° C. (S13 in FIG. 2), filtered (S14 in FIG. 2), and then clarified for example by using a centrifugal separator (S15 in FIG. 2). The solution may be further concentrated by using a known concentration method such as concentration under reduced pressure or freeze concentration (S16 in FIG. 2). In addition, a step other than this may be carried out as the post-extraction processing.

After the extraction step (S2) and the optional post-extraction processing (S3), a step of adding a second antioxidant and a powder tea (S5) is carried out. In the step, the antioxidant solution containing suspended a powder tea may be added as it is to the extract, but addition of an antioxidant solution containing the powder tea previously immersed therein for a certain period is desirable.

Processing in such an immersion step (S4) provides the powder tea with antioxidant action, by penetration of the antioxidant into the powder tea, possibly making the final-product instant green tea powder or beverage preparation more favorably green in color. The second antioxidant for use may be an organic acid or an organic acid salt (in particular, organic acid sodium salt), and typical favorable examples thereof include ascorbic acid, ascorbic acid salts (in particular, sodium ascorbate), citric acid, and citric acid salts (in particular, sodium citrate). When an ascorbic acid solution is used, the concentration of ascorbic acid for use is 0.05 to 2.0 wt %, preferably 0.05 to 1.0 wt %, and more preferably 0.1 to 0.5 wt %. The ratio of the ascorbic acid solution to the powder tea is 1.5 to 15 times, particularly 2 to 10 times, and most preferably 2.5 to 5 times. The temperature during immersion is 0 to 40° C., preferably 10 to 25° C. The immersion period is 5 to 90 minutes, particularly preferably 20 to 40 minutes.

The processing in such an immersion step (S4) may be carried out after the post-extraction processing (S3) or concurrently with extraction (S2) and post-extraction processing (S3). The first antioxidant used in the extraction step (S2) and the second antioxidant added with the powder tea may be the same as or different from each other, and are selected independently from the substances described above.

The powder tea thus immersed is added to the extract at a certain rate (S5). The mixing rate of the powder tea in the instant green tea is preferably 1 to 10 mass %, particularly preferably 3 to 9 mass %.

Addition of the antioxidant and the powder tea leads to decrease in pH and thus, an additional step (S6) of adjusting the pH of the solution is preferably carried out. It is particularly preferable to adjust the pH by using a potassium formulation. The potassium formulation is a potassium salt of any acid, and typical examples thereof include potassium carbonate, potassium chloride, potassium phosphate, and potassium tartrate. In particular, use of potassium carbonate is preferable. The pH of the solution is adjusted to 4.5 to 7.0, particularly to 5.5 to 6.0 by the adjustment.

It is preferable then to carry out a pre-drying processing step (S7). For example, sterilization treatment (S20 in FIG. 2) may be performed, but the step is not limited to such a step. Any sterilization method known in the art may be used favorably as the sterilization treatment method, and examples thereof include ultra heat treated sterilization (UHT sterilization), air-flow sterilization for example by using steam-heated air, and electron beam-irradiating sterilization.

The final step conducted is a drying step (S8). Any drying method known in the art, such as hot air drying, vacuum drying, freeze drying or spray drying, may be used as the drying method. In particular, use of vacuum drying, freeze drying or spray drying as the drying method is preferable, from the viewpoint of the color of the final product instant green tea powder or beverage preparation.

In the production method for the instant green tea, baking soda (i.e., sodium bicarbonate) may be used instead of the potassium formulation for pH adjustment, during pH adjustment of the extraction solvent in step S1 and in step S6. Even if potassium formulation is not used in the pH adjustment of the extraction solvent in step S1 and the pH adjustment in step S6, the potassium formulation may be added in any phase of any production process so that the concentration of the final product instant green tea becomes 0.8 to 5.6 mass %.

The present invention also relates to an instant green tea obtained by the production method above.

The instant green tea according to the present invention, or the instant green tea obtained by the production method according to the present invention can be served as beverage without need for any special means of processing into beverage, similarly to conventional instant green tea products. The instant green tea according to the present invention can be served as beverage, as it is dissolved in a suitable amount of hot or cold water. For example, 0.8 g of the instant green tea according to the present invention is dissolved in 100 cc of hot water before serving. However, it may be used as beverage, as the blending ratio with hot or cold water is adjusted as desired.

As will be described below in Examples, the instant green tea according to the present invention gives a green tea having the favorable flavor of green tea sufficiently, showing a vivid green color of powder and beverage, and resistant to powder tea sedimentation during the period from solubilization to final use as beverage. The advantageous effect above achieved by the instant green tea according to the present invention will become more distinctive from the following Examples.

EXAMPLES

The applicant prepared the following instant green tea according to the present invention and compared them with conventional instant green tea.

1. Instant Green Tea

Example 1

Figure 2:
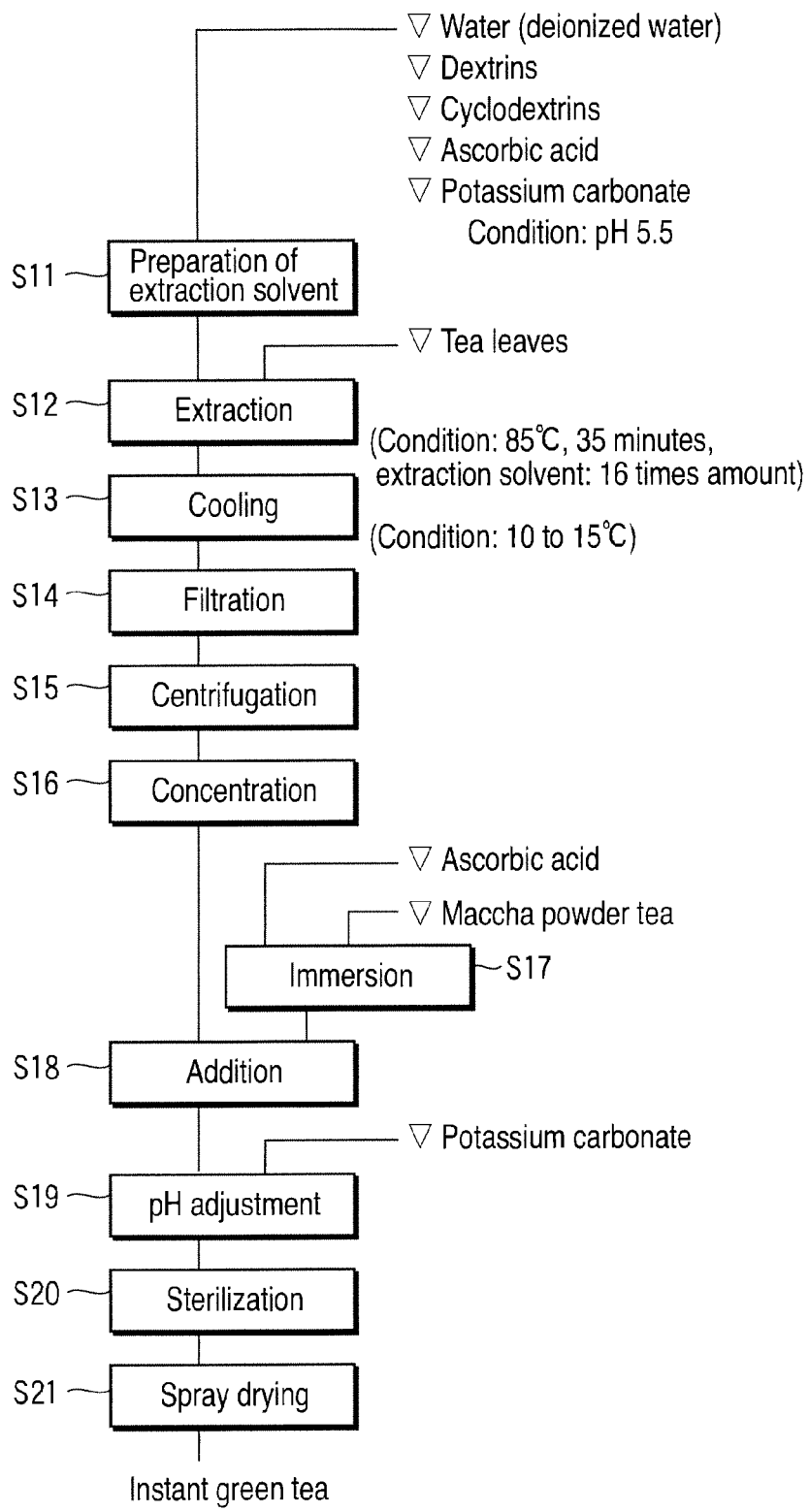
FIG. 2 is a flowchart showing a specific example of the method of producing an instant green tea according to the present invention.

An instant green tea of Example 1 was prepared by the following method. The schematic flow chart is shown in FIG. 2.

Preparation of extraction solvent (S11): 107 g of dextrin, 14 g of cyclodextrin and 5.6 g of ascorbic acid were added to and dissolved in 2.1 L of deionized water. The solution was then neutralized to pH 5.5 by addition of potassium carbonate.

Extraction (S12): Green tea ingredients were extracted from tea leaves by using the extraction solvent obtained. The tea leaves to be used (domestic tea leaves) were steamed and dried ones. The tea leaves and the extraction solvent in an amount larger by 15.5 times by weight than the leaves were placed in a kneader, and mixed therein, while agitated at 85° C. for 35 minutes for extraction.

Cooling (S13), filtration (S14), centrifugation (S15) and concentration (S16): After extraction, the extraction solution was cooled to 10 to 15° C. Then, the cooled extraction solution was roughly filtered for removal of large solid matters. The filtrate was centrifuged at 14200 G for 10 minutes, for removal of fine solid matters. The extraction solution was then concentrated in a thin film concentrator. The concentration was carried out under a condition of 39 to 40° C. and 1500 rpm, to a BX value (soluble solid matter) of 30.

Immersion (S17): Before addition of Maccha powder tea and others to the concentrated extraction solution, the Maccha powder tea was immersed in an ascorbic acid solution. The Maccha powder tea used was domestic Maccha powder tea previously ground to a 50% particle diameter of 1 to 50 μm. The ascorbic acid solution used was a 0.18% solution. 5 g of the Maccha powder tea was immersed in the ascorbic acid solution in an amount larger by 3 times by weight for 30 minutes.

Addition (S18): All of the Maccha powder tea previously immersed in the ascorbic acid solution was added with the ascorbic acid solution to the concentrated extraction solution.

pH adjustment (S19): A potassium carbonate solution was added dropwise to keep the pH to 5.5 for prevention of pH decrease caused by addition of the Maccha powder tea immersed in an ascorbic acid solution.

Sterilization (S20): After the pH adjustment, the extraction solution was sterilized by the plate sterilization method. The condition then was a temperature of 80° C. and a heating period of 30 seconds.

Spray drying (S21): The extraction solution was then dried by spray drying, to give a powdery instant green tea. The drying condition was 92° C.

The instant green tea according to the present invention thus prepared was designated as the compound of Example 1.

Example 2

An instant green tea was prepared in a similar manner to Example 1, except that the pH adjustment in steps S11 and S19 was carried out with baking soda (sodium bicarbonate), in place of potassium carbonate.

Example 3

An instant green tea was prepared in a similar manner to Example 1, except that the pH adjustment in steps S11 and S19 was carried out with baking soda (sodium bicarbonate), in place of potassium carbonate, and the Maccha powder tea product used was a domestic Maccha powder tea different in grade.

Example 4

An instant green tea was prepared in a similar manner to Example 1, except that the Maccha powder tea product used was a domestic Maccha powder tea different in grade (same as that in Example 3).

Example 5

An instant green tea was prepared in a similar manner to Example 1, except that no Maccha powder tea was used.

Example 6

A commercial product available from Ito En, Ltd. (registered trade name) was used as a compound of Example 6. The instant green tea contained a powder green tea instead of the Maccha powder tea and also sodium ascorbate in place of ascorbic acid used in production.

Example 7

A commercial product was used as a compound of Example 7. It contains a green tea, dextrins, oligosaccharides, an emulsifier and vitamin C as raw ingredients, according to the ingredient indication of the product.

Example 8

A commercial product available from Ito En, Ltd. (registered trade name) was used as a compound of Example 8. It contains a green tea extract, dextrins, cyclodextrins, a Maccha powder tea and vitamin C as raw ingredients, according to the ingredient indication of the product.

Example 9

A commercial product was used as a compound of Example 9. It contains a green tea extract, dextrins, cyclodextrins, a Maccha powder tea and vitamin C as raw ingredients, according to the ingredient indication of the product.

Example 10

A commercial product was used as a compound of Example 10. It contains a Sencha tea, dextrins and vitamin C as raw ingredients, according to the ingredient indication of the product.

Example 11

A commercial product was used as a compound of Example 11. It contains a Sencha tea and dextrins as raw ingredients, according to the ingredient indication of the product.

Example 12

A commercial product was used as a compound of Example 12. It contains a green tea, dextrins and vitamin C as raw ingredients, according to the ingredient indication of the product.

Example 13

A commercial product was used as a compound of Example 13. The product was not a green tea preparation, but was a Hojicha tea preparation. It contains a Hojicha roasted tea extract, dextrins and cyclodextrins as raw ingredients, according to the ingredient indication of the product.

Example 14

A commercial product was used as a compound of Example 14. The product was not a green tea preparation, but is a Mugicha tea (barley tea) preparation. It contains Mugicha (barley tea) extract, dextrins and cyclodextrins as raw ingredients, according to the ingredient indication of the product.

Example 15

"Mitsui High-Quality: Green Tea Demanding No Teapot" available from Mitsui Norin Co., Ltd. (registered trade name) was used as a compound of Example 15. It contained a green tea, dextrins and vitamin C as raw ingredients, according to the ingredient indication of the product.

Example 16

"AGF New Chajin Sencha tea" available from Ajinomoto General Foods, Inc. (registered trade name) was used as a compound of Example 16. It contains a green tea, dextrins, a Maccha powder tea and vitamin C as raw ingredients, according to the ingredient indication of the product.

The instant green teas according to the present invention were obtained in Examples 1 to 4, while instant green teas of Comparative Examples were obtained in Examples 5 to 12.

The ingredient composition or indication and the characteristics of these preparations are summarized in the following Table 1. In the Table, the content of each ingredient in the powder is expressed by mass %, with respect to 100 mass % of the entire powder.

2. Analytical Methods

The contents of sodium, potassium, amino acids (aspartic acid, glutamic acid, asparagine, serine, glutamine, arginine, alanine and theanine), the colors of beverage and powder, the turbidity and sedimentation when dissolved and the sensory evaluation of each of the compounds above were analyzed.

The contents of potassium and sodium were determined according to a literature (Kenjiro Ikegaya, Hirotsugu Takayanagi and Toyomasa Anan, "Quantitative Analysis of Tea Constituents", Tea Research Journal, No. 71 (1990) p 43 to 74), by dissolving 2 g of an instant green tea in 100 ml of hot water as the beverage concentration, agitating the mixture for 30 seconds, filtering the solution through a filter paper, and analyzing the inorganic components in the filtered solution by using a plasma emission spectroscopic analyzer (manufactured by Varian).

The amino acid contents were determined according to a literature (Kenjiro Ikegaya, Hirotsugu Takayanagi and Toyomasa Anan, "Quantitative Analysis of Tea Constituents", Tea Research Journal, No. 71 (1990) p 43 to 74), by dissolving 2 g of an instant green tea in 100 ml of hot water as the beverage concentration, agitating the mixture for 30 seconds, filtering the solution through a filter paper, and analyzing the free amino acid components by column chromatography.

The color of the instant green tea powder or beverage was determined by using a spectroscopic color difference meter SE200 manufactured by Nippon Denshoku Co. Ltd. In the case of a beverage, a sample was dissolved in ion-exchange water to a general concentration of 0.8 g/100 cc and the transmission color was observed. There was a concern about use of hot water at 40° C. or higher that it might lead to change in color tone, depending on the order of analysis, and thus,

TABLE 1

| | Tea extract | Dextrins | Cyclodextrins | Maccha powder tea | Vitamin C | Water |
|---|---|---|---|---|---|---|
| Example 1 | 24.70% | 53.90% | 5.80% | 8.50% | 3.10% | 4% |
| | | (SD-9) Extraction and pH adjustment performed with potassium carbonate | | | | |
| Example 2 | 24.70% | 52.40% | 5.70% | 8.50% | 4.70% | 4% |
| | | (SD-8) Extraction and pH adjustment performed with baking soda | | | | |
| Example 3 | 24.70% | 53.90% | 5.80% | 8.50% | 3.10% | 4% |
| | | (Sample 1104) Different in Maccha powder tea grade from Example 1 | | | | |
| Example 4 | 24.70% | 53.90% | 5.80% | 8.50% | 3.10% | 4% |
| | (Sample 1105) Different in Maccha powder tea grade from Example 1 (same as Example 3), processed with potassium carbonate | | | | | |
| Example 5 | 28.23% | 61.60% | 6.63% | — | 3.54% | 4% |
| | | (Sample 1501) No Maccha powder tea used, processed with potassium carbonate | | | | |
| Example 6 | 27.00% | 50.85% | 10.80% | *10% | **1.50% | |
| | Available from Ito En Ltd. (*: not Maccha powder tea, but powdered green tea, **: containing sodium ascorbate) | | | | | |
| Example 7 | Ingredient indication: green tea, dextrins, oligosaccharides, emulsifier, and vitamin C | | | | | |
| | Commercial product | | | | | |
| Example 8 | 26.30% | 52.30% | 5.70% | 7% | 4.70% | 4% |
| | Available from Ito En Ltd. | | | | | |
| Example 9 | Ingredient indication: green tea extract, dextrins, cyclodextrins, Maccha powder tea and vitamin C | | | | | |
| | Commercial product | | | | | |
| Example 10 | Ingredient indication: Sencha tea, dextrins and vitamin C | | | | | |
| | Commercial product | | | | | |
| Example 11 | Ingredient indication: Sencha tea and dextrins | | | | | |
| | Commercial product | | | | | |
| Example 12 | Ingredient indication: green tea, dextrins and vitamin C | | | | | |
| | Commercial product | | | | | |
| Example 13 | Ingredient indication: Hojicha (roasted tea) extract, dextrins and cyclodextrin | | | | | |
| | Commercial product: Hojicha (roasted tea) | | | | | |
| Example 14 | Ingredient indication: Mugicha (barley tea) extract, dextrins and cyclodextrin | | | | | |
| | Commercial product: Mugicha tea (barley tea) | | | | | |
| Example 15 | Ingredient indication: green tea, dextrin and vitamin C | | | | | |
| | Obtained from Mitsui Norin Co., Ltd. trade name "Mitsui High-Quality: Green Tea Demanding No Teapot" | | | | | |
| Example 16 | Ingredient indication: green tea, dextrins, Maccha powder tea and vitamin C | | | | | |
| | Available from Ajinomoto General Foods Inc., trade name: "AGF New Chajin Sencha Tea" | | | | | | cold water (at 10 to 25° C.) was used. The powder color was determined by observing the surface with the color difference meter.

The turbidity was determined by measuring the transmittance of the light at a wavelength of 660 nm by using a spectrophotometer U-3310 manufactured by Hitachi High-Technologies Corp. (cell length: 10 mm). The turbidity immediately after solubilization of the sample was determined. The sedimentation was determined by measuring the turbidity immediately and 10 minutes after solubilization and calculating the difference in turbidity between them.

The sensory evaluation was performed by 5 qualified examiners. 0.8 g of each sample was placed in a tea cup; 100 cc of hot water at 95° C. was poured in; and the mixture was stirred thoroughly before drinking. The flavor, color tone, turbidity and sedimentation thereof were rated respectively with 0 to −5 points, and a total point of 0 to −5 points was rated ○, that of −6 to −15 points, Δ, and that of −16 point or less, ×.

3. Analytical Results

The analytical results are summarized in Tables 2 to 5.

The sodium content, potassium content, amino acid content, and the value of the potassium content divided by the amino acid content are shown in Table 2. The unit for each content is mg. The content was in 0.6 g of the powder only in Example 15, and in 0.8 g of the powder in other Examples. A potassium content in the range of 13 to 25 mg was rated A; a content in the range of 10 to 35 mg except A, B; and a content in the range of 7 to 45 mg except A and B, C. Alternatively, a potassium content/amino acid content rate in the range of 4 to 10 was rated A, and that not in the range above, B.

As will be acknowledged, the potassium content is higher in Examples 1, 4 and 5 than in other Examples. In addition, the sodium content is particularly lower in Examples 1, 4 and 5.

TABLE 2

|  | Na (mg) | K (mg) | K/(Na + K) | Amino acid (mg) | K/amino acid |
|---|---|---|---|---|---|
| Example 1 Lot 1 | 0.13 | 17.20 A | 0.99 | 2.88 | 6.0 A |
| Example 1 Lot 2 | 0.13 | 17.25 A | 0.99 | 2.48 | 7.0 A |
| Example 1 Lot 3 | 0.12 | 17.46 A | 0.99 | 2.56 | 6.8 A |
| Example 1 Lot 4 | 0.12 | 17.58 A | 0.99 | 2.4 | 7.3 A |
| Example 1 Lot 5 | 0.12 | 17.38 A | 0.99 | 2.24 | 7.8 A |
| Example 2 | 4.08 | 11.76 B | 0.74 | 2.48 | 4.7 A |
| Example 3 | 2.68 | 10.42 B | 0.80 | 2.24 | 4.7 A |
| Example 4 | 0.29 | 15.50 A | 0.98 | 2.56 | 6.1 A |
| Example 5 | 0.18 | 16.74 A | 0.99 | 1.76 | 9.5 A |
| Example 6 | 1.19 | 11.89 B | 0.91 | 5.60 | 2.1 B |
| Example 7 | 1.75 | 6.89 C | 0.80 | 4.24 | 1.6 B |
| Example 8 | 4.52 | 9.60 C | 0.68 | 3.12 | 3.1 B |
| Example 9 | 1.24 | 9.50 C | 0.88 | 4.88 | 1.9 B |
| Example 10 | 1.21 | 11.64 B | 0.91 | 6.32 | 1.8 B |

TABLE 2-continued

|  | Na (mg) | K (mg) | K/(Na + K) | Amino acid (mg) | K/amino acid |
|---|---|---|---|---|---|
| Example 11 | 1.48 | 12.78 B | 0.90 | 6.96 | 1.8 B |
| Example 12 | 1.82 | 8.57 C | 0.82 | 2.00 | 4.3 A |
| Example 13 | 0.29 | 18.68 A | 0.98 | 0.64 | 29.2 B |
| Example 14 | 0.25 | 4.13 — | 0.94 | 0.08 | 51.6 B |
| Example 15 | 0.32 | 7.42 C | 0.96 | 3.36 | 2.2 B |
| Example 16 | 1.59 | 11.82 B | 0.88 | 6.00 | 2.0 B |

K (potassium)
A: in the range of 13 to 25 mg
B: in the range of 10 to 35 mg except for A
C: in the range of 7 to 45 mg except for A and B
K/amino acid:
A: in the range of 4 to 10
B: not in the range of 4 to 10

Analytical results concerning the color of the beverage and powder are shown in Table 3. Beverages having the value a of −1 to −4 was rated A, and those having other values, C. Powders having the value a of 0 to −8 was rated A, and those having other values, C.

TABLE 3

|  | Beverage color | | | Powder color | | |
|---|---|---|---|---|---|---|
|  | L | a/evaluation | b | L | a/evaluation | b |
| Example 1 Lot 1 | 26.87 | −2.10 A | 10.19 | 40.08 | −6.41 A | 17.85 |
| Example 1 Lot 2 | 26.87 | −2.10 A | 10.19 | 40.08 | −6.41 A | 17.85 |
| Example 1 Lot 3 | 26.87 | −2.10 A | 10.19 | 40.08 | −6.41 A | 17.85 |
| Example 1 Lot 4 | 26.87 | −2.10 A | 10.19 | 40.08 | −6.41 A | 17.85 |
| Example 1 Lot 5 | 26.87 | −2.10 A | 10.19 | 40.08 | −6.41 A | 17.85 |
| Example 2 | 26.31 | −1.36 A | 9.45 | 48.47 | −5.05 A | 15.50 |
| Example 3 | 26.26 | −1.21 A | 9.31 | 49.45 | −7.10 A | 22.55 |
| Example 4 | 25.77 | −1.24 A | 9.26 | 50.04 | −7.81 A | 23.19 |
| Example 5 | 88.61 | −7.48 C | 22.29 | 68.20 | −3.95 A | 29.56 |
| Example 6 | 46.22 | −2.81 A | 14.45 | 56.92 | −5.14 A | 22.54 |
| Example 7 | 45.98 | −2.24 A | 13.94 | 55.45 | −4.15 A | 22.17 |
| Example 8 | 40.92 | −2.19 A | 12.15 | 48.63 | −4.66 A | 18.95 |
| Example 9 | 68.63 | −3.69 A | 14.30 | 64.52 | −7.04 A | 26.52 |
| Example 10 | 64.45 | −3.76 A | 14.95 | 59.34 | −4.76 A | 25.31 |
| Example 11 | 64.25 | −2.82 A | 14.76 | 59.15 | −5.24 A | 23.77 |
| Example 12 | 91.73 | −5.57 C | 18.48 | 59.83 | 2.07 C | 25.73 |
| Example 13 | 81.83 | −2.56 A | 31.62 | 45.46 | 3.44 C | 15.75 |
| Example 14 | 81.42 | −1.14 A | 27.10 | 46.92 | 3.20 C | 17.04 |

TABLE 3-continued

| | Beverage color | | | Powder color | | |
|---|---|---|---|---|---|---|
| | L | a/evaluation | b | L | a/evaluation | b |
| Example 15 | 61.68 | −2.03 A | 11.72 | 52.10 | −3.47 A | 21.01 |
| Example 16 | 55.03 | −2.12 A | 15.90 | 47.81 | −3.42 A | 21.63 |

Beverage color:
A: Value a in the range of −4 to −1 (vivid green)
C: Value a not in the range of −4 to −1
Powder color
A: Value a in the range of −8 to 0 (vivid green)
C: Value a not in the range of −8 to 0

Table 4 shows the analytical results concerning the turbidity and sedimentation of the beverages. A higher observed value means higher light transmittance, while a lower value means higher turbidity of the beverage. As for the turbidity, a transmittance of 15% or less was rated A, and that of more than 15%, C. Alternatively, a difference in transmittance of 0.6 or less was rated A; that of more than 0.6 and 1.0 or less, B; and that of more than 1.0, C. The concentration of the test sample was 0.6 g/100 cc in Example 15, while 0.8 g/100 cc in other Examples.

The results show that the turbidity of Examples 1 to 4 when dissolved was significantly higher than that of Examples 5 to 16. In addition, the turbidity 10 minutes after solubilization remained almost unchanged in Examples 1 to 4, and the change rate was particularly lower in Example 1.

TABLE 4

| | T % immediately after solubilization (evaluation 1) | T %, 10 minute after solubilization | Difference (evaluation 2) |
|---|---|---|---|
| Example 1 Lot 1 | 4.70 A | 4.90 | 0.20 A |
| Example 1 Lot 2 | 4.70 A | 4.90 | 0.20 A |
| Example 1 Lot 3 | 4.70 A | 4.90 | 0.20 A |
| Example 1 Lot 4 | 4.70 A | 4.90 | 0.20 A |
| Example 1 Lot 5 | 4.70 A | 4.90 | 0.20 A |
| Example 2 | 4.80 A | 5.40 | 0.60 A |
| Example 3 | 4.30 A | 5.30 | 1.00 B |
| Example 4 | 4.30 A | 4.90 | 0.60 A |
| Example 5 | 75.60 C | 77.30 | 1.70 C |
| Example 6 | 17.10 C | 24.00 | 6.90 C |
| Example 7 | 16.30 C | 22.60 | 6.30 C |
| Example 8 | 14.90 A | 16.20 | 1.30 C |
| Example 9 | 48.40 C | 49.50 | 1.10 C |
| Example 10 | 42.40 C | 43.20 | 0.80 B |
| Example 11 | 41.90 C | 44.20 | 2.30 C |
| Example 12 | 90.20 C | 90.80 | 0.60 A |
| Example 13 | — | — | — |
| Example 14 | — | — | — |
| Example 15 | 35.20 C | 39.40 | 4.20 C |
| Example 16 | 27.40 C | 30.00 | 2.60 C |

Evaluation result 1
A: T % immediately after solubilization of 15% or less
C: T % immediately after solubilization of more than 15%
Evaluation result 2
A: Difference in T %: 0.6% or less
B: Difference in T %: more than 0.6% and 1.0% or less
C: Difference in T %: more than 1.0%

Results of the sensory evaluation and overall rating of each Example are shown in Table 5.

The results show that the rating was mostly better in Examples 1 to 4. In particular, the rating was higher in Examples 1 and 4. In addition, the overall rating was also better in Examples 1 to 4, especially in Examples 1 and 4.

TABLE 5

| | Sensory evaluation/overall rating | | | | | |
|---|---|---|---|---|---|---|
| | Taste | Flavor | Color tone | Turbidity | Sedimentation | Overall rating |
| Example 1 Lot 1 | ○ | ○ | ○ | ○ | ○ | ○ |
| Example 1 Lot 2 | ○ | ○ | ○ | ○ | ○ | ○ |
| Example 1 Lot 3 | ○ | ○ | ○ | ○ | ○ | ○ |
| Example 1 Lot 4 | ○ | ○ | ○ | ○ | ○ | ○ |
| Example 1 Lot 5 | ○ | ○ | ○ | ○ | ○ | ○ |
| Example 2 | Δ | Δ | Δ | ○ | ○○ | Δ |
| Example 3 | Δ | Δ | Δ | ○ | Δ | Δ |
| Example 4 | ○ | ○ | ○ | ○ | ○ | ○ |
| Example 5 | x No Maccha powder tea | Δ | x No Maccha powder tea | x | Δ No Maccha powder tea | x |
| Example 6 | Δ | x | Δ | x | x | x |
| Example 7 | x | x | x | x | x | x |
| Example 8 | x | x | x | ○ | x | x |
| Example 9 | x | x | x | x | x | x |
| Example 10 | x | x | x | x | Δ | x |

TABLE 5-continued

| | Sensory evaluation/overall rating | | | | | |
|---|---|---|---|---|---|---|
| | Taste | Flavor | Color tone | Turbidity | Sedimentation | Overall rating |
| Example 11 | x | x | x | x | x | x |
| Example 12 | x | x | x | x | o<br>No Maccha powder tea | x |
| Example 13 | — | — | — | Hojicha tea | Hojicha tea | Hojicha tea |
| Example 14 | — | — | — | Mugicha tea (barley tea) | Mugicha tea (barley tea) | Mugicha tea (barley tea) |
| Example 15 | x | x | x | x | x | x |
| Example 16 | Δ | x | Δ | x | x | x |

Taste
o: Favorable taste of tea without bitterness
Δ: Some favorable taste of tea but with some bitterness
x: Little favorable taste of tea with strong bitterness
Flavor
o: Impressive mild flavor of tea
Δ: Weak mild flavor of tea
x : Little mild flavor of tea
Color tone
o: Bluish green, similar to the tea freshly served from teapot
Δ: Bluish green similar to the tea freshly served from teapot, but with some yellowing in color
x: Only yellowish or reddish pale green
Turbidity
o: Highly turbid
x: Slightly or not turbid
Sedimentation
o: The beverage remained turbid, 10 minutes after solubilization
x: The beverage was clarified, 10 minutes after solubilization

4. Discussion and Conclusion

The results of the analyses and sensory evaluations above show that the instant green teas according to the present invention are rated higher in the vivid green color of the powders and beverages, preservation of turbidity, and taste and flavor, than conventional instant green tea. The results also showed that such three advantageous effects could be obtained simultaneously only with the instant green teas according to the present invention.

The present invention provide the taste and feeling during drinking similar to those of the tea freshly prepared from tea leaves for example by using a teapot, which was not possible with conventional instant green tea.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An instant green tea comprising:
   a green tea extract;
   an antioxidant;
   a powder tea; and
   potassium,
   wherein the potassium content is 0.8 to 5.6 mass % in the instant green tea, the ratio of potassium/(sodium+potassium) is 0.5 to 1.0, and the ratio of potassium/amino acids is 4.7 to 10.

2. The instant green tea according to claim 1, wherein the antioxidant is ascorbic acid or citric acid.

3. The instant green tea according to claim 1, further comprising a drying aid, wherein the drying aid is dextrins, cyclodextrins, or the combination thereof.

4. A method of producing an instant green tea, comprising:
   a step of preparing an extraction solution from tea leaves with an extraction solvent containing a drying aid and a first antioxidant that is previously adjusted to a pH in the neutral zone with a first potassium preparation;
   a step of adding a second antioxidant and a powder tea to the extraction solution obtained; and
   a step of drying the extraction solution after the addition step,
   wherein the potassium content is adjusted to 0.8 to 5.6 mass % in the instant green tea.

5. The method of producing an instant green tea according to claim 4, wherein each of the first and second antioxidants is independently a substance selected from the group consisting of ascorbic acid, sodium ascorbate, citric acid and sodium citrate.

6. The method of producing an instant green tea according to claim 4, further comprising a step of adjusting the pH of the solution with a second potassium preparation after the step of adding the powder tea.

7. The method of producing an instant green tea according to claim 6, wherein each of the first and second potassium preparations is potassium carbonate.

* * * * *